(12) United States Patent
Weidenschlager (10) Patent No.: US 8,489,729 B2
(45) Date of Patent: Jul. 16, 2013

(54) SYSTEM AND METHOD FOR SOCIAL SERVICE EVENT PROCESSING AND MANAGEMENT

(75) Inventor: Armin Weidenschlager, Muehlhausen (DE)

(73) Assignee: SAP AG, Walldorf (DE)

(*) Notice: Subject to any disclaimer, the term of this patent is extended or adjusted under 35 U.S.C. 154(b) by 1355 days.

(21) Appl. No.: 11/479,655

(22) Filed: Jun. 30, 2006

(65) Prior Publication Data

US 2007/0220140 A1 Sep. 20, 2007

Related U.S. Application Data

(60) Provisional application No. 60/781,737, filed on Mar. 14, 2006.

(51) Int. Cl.
*G06F 15/173* (2006.01)
*G06Q 10/00* (2012.01)

(52) U.S. Cl.
USPC .......... 709/224; 709/223; 709/225; 705/7.26; 705/301; 705/320; 705/321; 705/322

(58) Field of Classification Search
USPC ..... 705/8, 7.26, 301, 320, 321, 322; 709/223, 709/224, 225
See application file for complete search history.

(56) References Cited

U.S. PATENT DOCUMENTS

| | | | | |
|---|---|---|---|---|
| 5,754,855 A | * | 5/1998 | Miller et al. | 718/106 |
| 2001/0044738 A1 | * | 11/2001 | Elkin et al. | 705/8 |
| 2002/0056004 A1 | * | 5/2002 | Smith et al. | 709/227 |
| 2002/0165893 A1 | * | 11/2002 | Hunsinger et al. | 709/100 |
| 2003/0060214 A1 | * | 3/2003 | Hendrey et al. | 455/456 |
| 2003/0126181 A1 | * | 7/2003 | Young | 709/100 |
| 2003/0204429 A1 | * | 10/2003 | Botscheck et al. | 705/8 |
| 2005/0096962 A1 | * | 5/2005 | Narasimhan et al. | 705/9 |
| 2007/0061424 A1 | * | 3/2007 | Mattaway | 709/219 |

* cited by examiner

*Primary Examiner* — Kevin Bates
*Assistant Examiner* — Mohammed Ahmed
(74) *Attorney, Agent, or Firm* — Kenyon & Kenyon LLP (57) ABSTRACT

An event processing mechanism is provided as a system interface between software applications that contain events that need to be processed, a BRF program that executes event rules, and workflow processes that capture the processing of the events. A social service eventing program enables centralized and streamlined event processing by receiving event information from software applications, assigning appropriate event rules based on the received information and applicable business or regulatory rules, prioritizing event rules, setting and communicating applicable event rules to parameterized rules to be executed by a BRF program.

49 Claims, 7 Drawing Sheets

SYSTEM AND METHOD FOR SOCIAL SERVICE EVENT PROCESSING AND MANAGEMENT

CROSS-REFERENCE TO RELATED APPLICATIONS

This application claims the benefit of U.S. provisional application No. 60/781,737, filed on Mar. 14, 2006, herein incorporated by reference.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND

The present invention generally relates to a mechanism and method for centrally administering event processing for various software applications, and more specifically to streamlined event processing for social service entities.

Currently, many event processing systems are implemented as frameworks that operate as rule-based programs running in the background of different applications. Each application or framework establishes its own set of business rules and logics, and manages events that occur within its own work processes. This existing scheme forces a user to administer events that occur throughout different applications in a disparate fashion. The user must check each application separately to determine whether an event needs to be initiated to kick off a work process. Additionally, the user must also repeatedly inspect every application to determine the status of events that have already been initiated and to decide what subsequent steps other systems might need to take in order to complete a work process.

This decentralized event management scheme poses many challenges to the user. First of all, as the number of applications increases, the administrator's task to monitor all events for many clients becomes increasingly difficult. In a situation where events in several different applications need to be processed for one particular client, the administrator must repeatedly initiate each event for every application involved. This unnecessary repetition of event processing initiation creates numerous opportunities for errors.

Secondly, because each application handles its own events, there is no streamlined processing of an event that involves multiple applications. In other words, when a cross-application event kicks-off a work process, after the completion of the first stage of the process in the first application, the administrator must determine that the first step has been completed and then manually initiates a subsequent step in the next application involved in the process to continue the event. This constant monitoring of multiple applications for large volumes of events is extremely time consuming and labor intensive.

Finally, to ensure that a new administrator can competently manage event processing, he/she must be trained to monitor and operate all different software applications that house event management systems. The extra time and efforts spent on personnel training for every application is an inefficient expenditure of what often prove to be limited monetary and human resources.

The present invention creatively overcomes the tremendous challenges of existing prior art systems discussed above. The proposed mechanism is implemented as a system component that is independent from applications. As an interface between an application that raises an event that needs to be processed, a business rule framework ("BRF") that executes a given set of business rules, and a work flow process that captures the processing of the event, the current invention allows an administrator to centrally manage and process events that occur throughout different applications. It provides user interfaces which display information about events that have already been raised, such as business rules, also known as event subscriptions, and work process information, about every event in every application in the network. It also provides an error log for event processing so that the administrator can easily discern which event has encountered an operational problem and what type of error has occurred. The invention recognizes the need to execute some business rules ahead of others, and therefore, enables business rules with different priorities to be processed asynchronously. Lastly, the invention captures a context for each event, so that the system retains information about underlying real life circumstances for each event.

The proposed system is especially applicable to social service entities as an effective benefits claims management tool, where a benefit claim is processed as an event. Many local and national government agencies handle millions of claim submissions and benefits calculations every year. The notion that government agency clerks must manually process each and every benefit claim submitted is untenable. More and more local and national governments are beginning to take advantage of modern technical capabilities to enable fast and efficient solutions for local citizens.

A centralized and streamlined event management system for processing benefits claims is urgently needed in the rapidly growing area of e-Government. For one, government agencies commonly administer many different types of benefits, which may require running multiple software applications. It is also often the case that citizens change their beneficiary status based on real life events. For example, an elderly war veteran citizen with low-income is moving to a new location. This individual, who has been receiving social benefits such as Medicaid, Medicare, Social Security, and veterans benefits, need to inform the current local municipality that his benefits from that location should be stopped, and that the municipality at the new location to where he is moving should be providing his social benefits. It may also be the case that a woman, who has been on pregnancy leave and recently delivered a baby, need to change her beneficiary status from pregnancy leave to maternity leave, and receive appropriate social benefits based on her new status. The present invention would automatically apply the latest regulatory rules according to changes in real life events and allow a system administrator at a government agency to process benefits claims quickly, saving much needed efficiency in personnel training.

DETAILED DESCRIPTION OF THE INVENTION

To facilitate an understanding of the terms used herein, the following definition is provided.

The term "business rule framework (BRF)" is intended to describe a cross-application tool that is used to implement automatic checks on conditions of a set of business rules and to trigger different actions based on the results of the checks. An example of such a system is found within SAP's Claims Management, a part of SAP for Insurance.

Embodiments of the present invention provide a system interface between an application with an event that must be processed, a BRF program with the capabilities of performing automatic checks on the rules of the event and executing the rules, and a workflow process that captures the processing of the event. According to these embodiments, SSE receives event information from the application. According to the security authorizations assigned to the system administrator using SSE, certain business or regulatory rules may be applied to the event received. Based on the event information received and the available business or regulatory rules, SSE assigns and filters a set of event rules to be executed immediately and a set of event rules to be processed after the execution of the first set of event rules. With the additional identification of a case category for the event, SSE establishes a set of parameterized rules that are executable by the BRF program, containing information such as the case category of the event, the processing priority of the subscriptions, and the authorization level of the system user. The BRF program executes the parameterized rules according to the processing priority established by SSE, and initiates necessary administrative actions thereafter. This centralized and streamlined approach allows various software applications to communicate with one system interface, without the tedious tasks of customizing event processing systems for different software applications.

Figure 1:
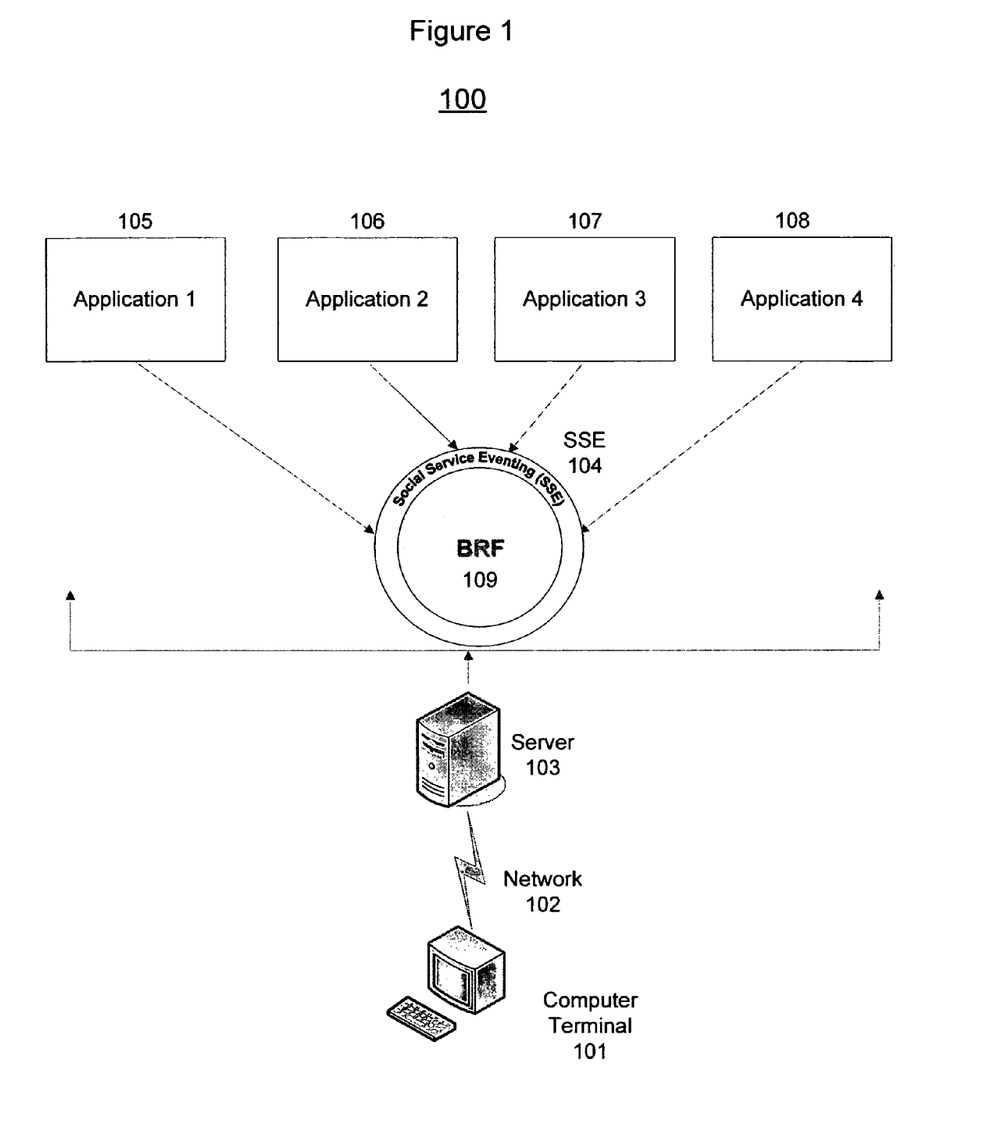
FIG. 1 is a functional block diagram illustrating one embodiment of the system overview of Social Service Eventing ("SSE").

FIG. 1 is a block diagram of one embodiment of the present invention. It shows a computer system 100 containing computer terminal 101, network 102, server 103, SSE 104, software applications 105-108, and BRF program 109. As illustrated, the various components of the computer system are connected via network 102. Further, server 103 houses SSE 104, BRF program 109, and software applications 105-108, which contain events that need to be processed. SSE 104 is implemented as a system interface which processes events raised by software applications 105-108 so that rules assigned to these events can be executed by an independent BRF program 109.

In one embodiment of the invention, SSE 104 receives event data from software applications 105-108. After the receipt of the information, SSE 104 provides receipt confirmations, so that software applications 105-108 may continue their current work processes without further delays or interruptions. This exchange of information occurs whenever software applications 105-108 need to raise events to be processed. In this manner, SSE improves system performance because software applications 105-108 do not need to wait for existing events to be processed before returning to their existing work or raising new events.

Figure 2:
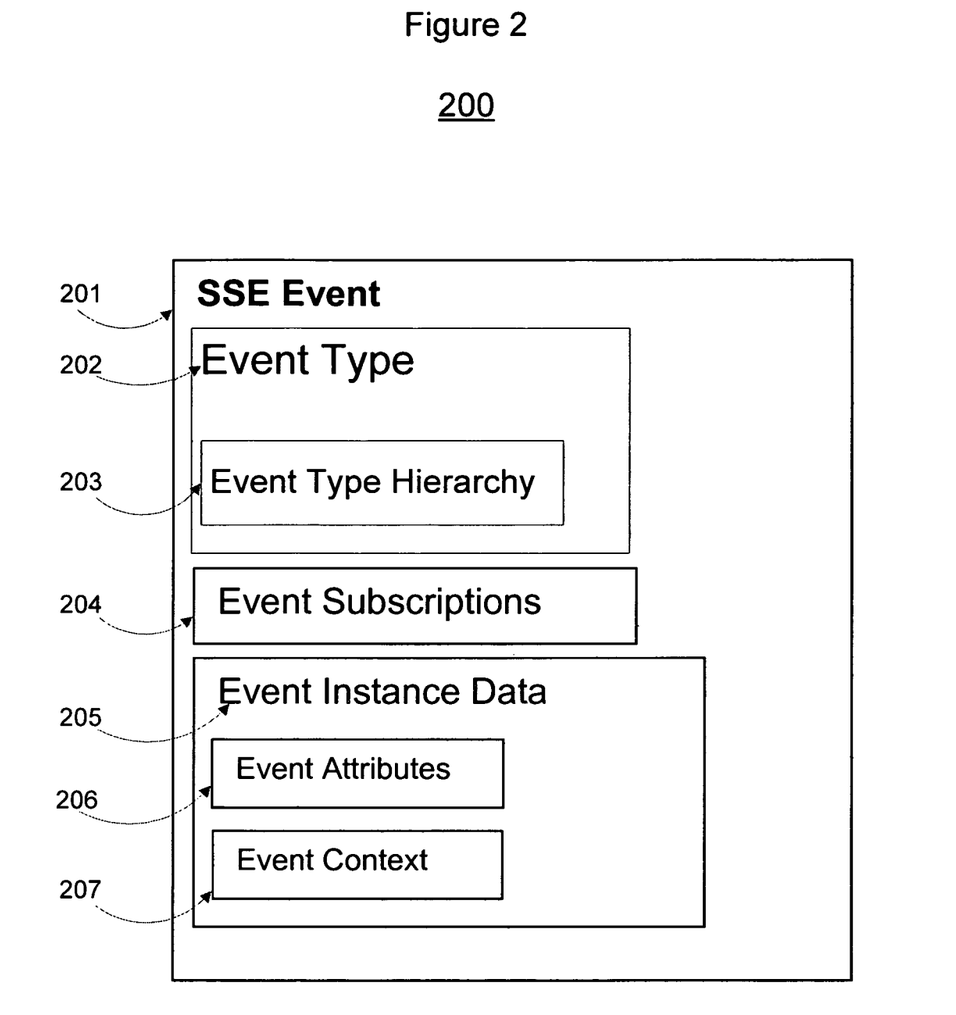
FIG. 2 is a block diagram illustrating one embodiment of the various data components of a SSE event.

FIG. 2 is a block diagram illustrating one embodiment of information 200 available for an event raised in SSE. Specifically, in one embodiment, SSE event 201 is implemented as a customizable BRF object that contains data elements such as event type 202, event subscriptions 204, and event instance data 205. Further, event type 202 is defined by a set of data elements representing information such as technical identification number for the event, short description of the event, and the date and time of event creation. This set of data elements is customizable so that the system administrator can add new information if necessary. Event type 202 also contains event type hierarchy 203, which is a data element representing information pertaining to the hierarchical relationship between one event and another. For example, event type hierarchy 203 exists if an attribute of event type 202 references a "parent event." The existence of event type hierarchy 203 means that a "child event" inherits event subscriptions 204 and event context 207 from its "parent event."

Figure 6:
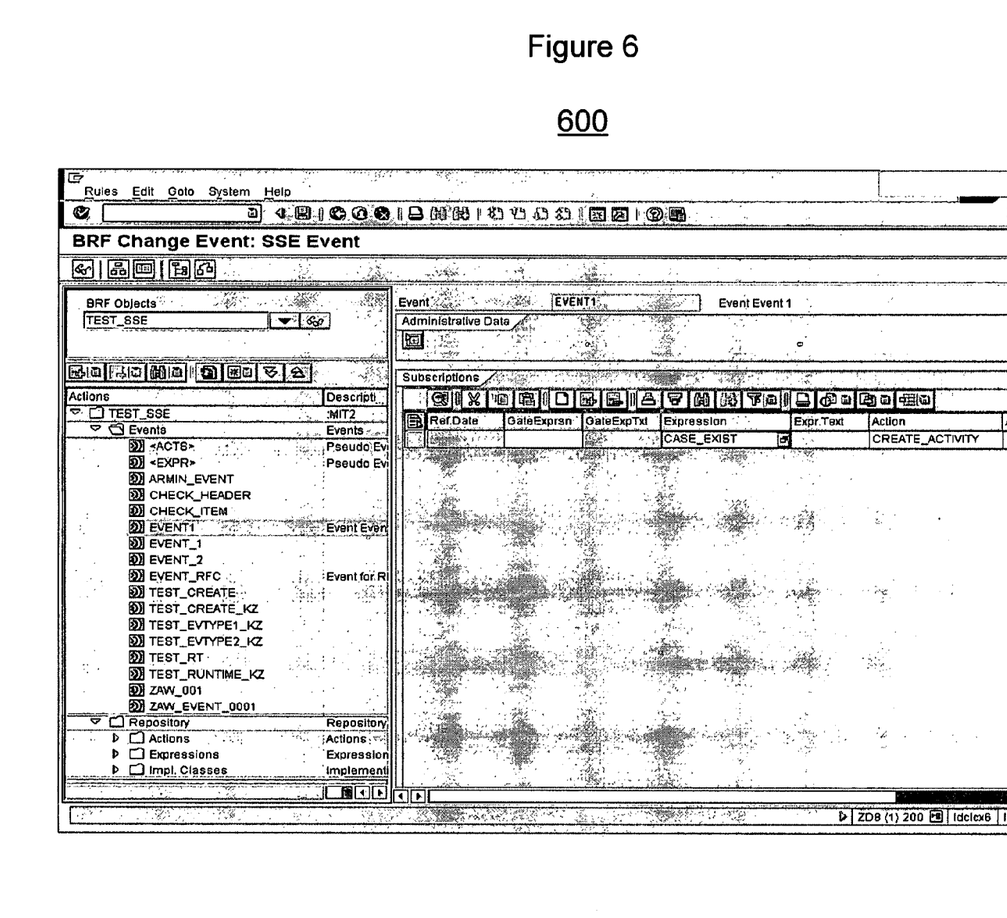
FIG. 6 is a screen shot illustrating an example of an event subscription maintenance user interface provided to a system administrator in SSE.

Event subscriptions 204 are a set of business or regulatory rules that are embodied in logical conditions or expressions, and are assigned to the event by SSE 104. If the logical conditions or expressions are verified to be true by BRF program 109, then BRF program 109 initiates administrative actions, such as creating a notification or creating a case note. In one embodiment of the invention, access or applicability of event subscriptions 204 is based on the security authorization assigned to the system administrator using SSE 104. Assignment of authorization can be based on an individual level or on an organizational unit level. FIG. 6 provides an example of a graphical user interface for the maintenance of event subscriptions 204. Based on the authorization, certain event subscriptions can be hidden or made unavailable to the system administrator. FIG. 6 illustrates that, as a maintenance measure for event subscriptions 204, the system administrator can customize event subscriptions 204 by assigning specific actions or activities if a particular expression is found to be true, or by adding new, or deleting existing event rules.

SSE event 201 also contains event instance data 205, which is a set of data elements representing information instantiated by software applications 105-108 when events are raised. Event instance data 205 includes event attributes 206 and event context 207. Data elements representing information such as event partner, date, time, identification of the relevant software application system, and a timestamp of when the event was raised can be included in event attributes 206. Event context 207 contains data elements representing information about the underlying life event, and can include a sub-context for each event. If event type hierarchy 203 exists, event context 207 is inherited by a "child event" from its "parent event," including sub-contexts. For example, if a "parent event" has context A, which has a sub-context, context B, then a "child event" inherits both contexts A and B as its event context 207, while maintaining the context and sub-context relationship.

Figure 3:
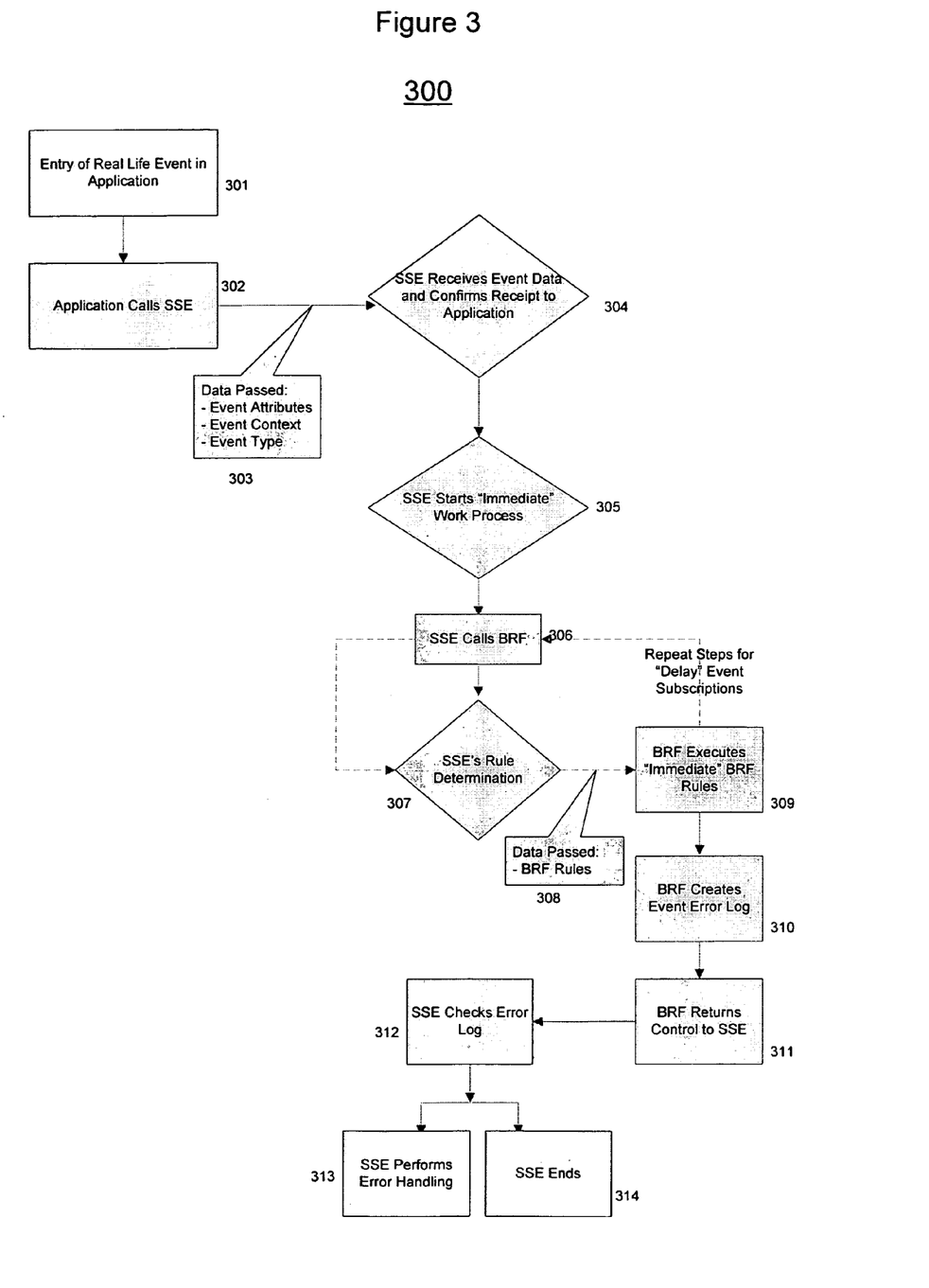
FIG. 3 is a flow chart illustrating one embodiment of the sequence of event processing using SSE.
Figure 4:
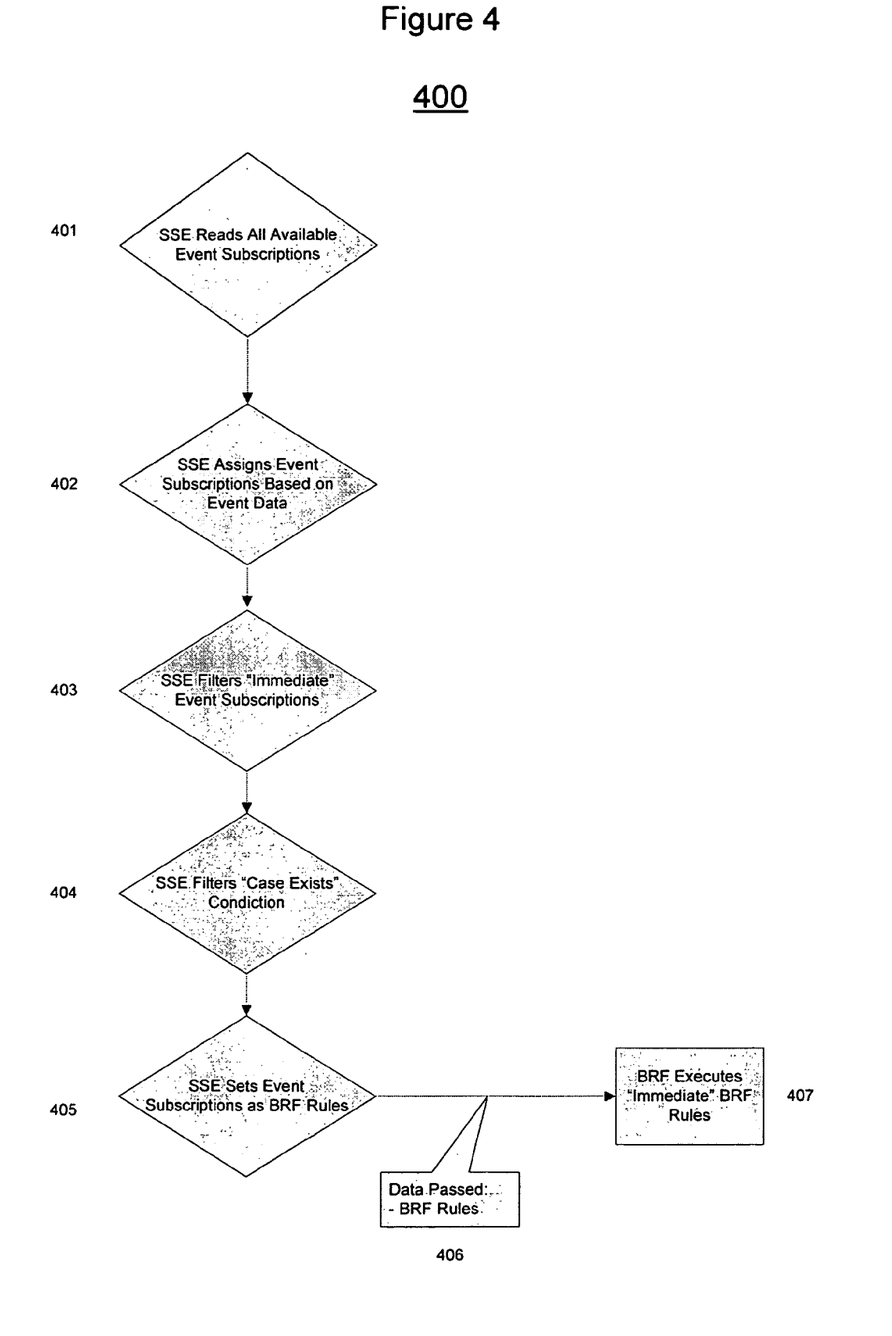
FIG. 4 is a flow chart illustrating one embodiment of the sequence of steps in the determination of rules in SSE.

FIG. 3 is a flow chart illustrating one embodiment of the sequential steps in an event processing method utilizing the current invention. In step 301, software application 105 receives information regarding real life events. In the next step, 302, software application 105 calls SSE 104, and passes event type 202, event attributes 206, and event context 207 to SSE 104 in step 303. After the receipt of event data from software application 105, SSE 104 provides confirmation on the receipt of the information in step 304, so that software application 105 may continue its existing work process. In step 305, SSE 104 initiates a work process that captures the immediate processing of event subscriptions 204. Subsequently, SSE 104 also calls BRF program 109 in step 306. To apply the appropriate event subscriptions to the set of event data received, SSE 104 performs rule, determination in step 307, of which one embodiment is illustrated in FIG. 4. After SSE 104 performs rule determination which includes setting a set of event subscriptions to parameterized BRF rules, SSE 104 sends the BRF rules to BRF program 109 in step 308. In step 309, BRF program 109 executes BRF rules that need to be processed immediately, and calls SSE 104 to repeat steps 306-309 for the execution of event subscriptions with delayed processing priority. In step 310, after executing event subscriptions 204, BRF program 109 creates an event error log, and returns event processing control back to SSE 104 in step 311. As part of its error handling, SSE 104 checks the error log created by BRF program 109, in step 312. If errors exist, SSE 104 performs error handling in step 313. If no error occurred, then SSE 104 has completed its functionality.

In one embodiment of the invention, SSE 104 performs error handling in the above referenced step 313, by examining the nature of the error occurred. That is, if an error occurred in the process after software application 105 raised SSE event 201, then the software application 105 rolls back its work, and SSE event 201 will not be processed. If a temporary error occurred while BRF program 109 was executing BRF rules, then SSE 104 rolls back its work by calling BRF program 109 after a pre-determined period of time. Thereafter, BRF program 109 executes BRF rules. As the error detection and work rollback are performed automatically by SSE 104, the system administrator need not manually restart event processing. If a permanent error occurred while BRF program 109 was executing BRF rules, then system administrator must restart event processing by accessing workflow processes initiated by SSE 104. According to another embodiment of the current invention, the system administrator can customize error handling by designating errors as temporary or permanent errors.

FIG. 4 is a block diagram that illustrates one embodiment of rule determination in SSE 104. In step 401, SSE 104 reads available event subscriptions 204. By comparing event subscriptions 204 to the event data received from software application 105, in step 402, SSE 104 determines which event subscriptions should be applied and the processing priority of these event subscriptions. Subsequent to the assignment of event subscriptions 204, SSE 104 filters event subscriptions that need to be executed immediately, in step 403. For example, if a benefit claim is submitted by a woman who has been on pregnancy leave and has recently delivered a baby, then SSE 104 would compare the real life event information received from software application 105 to a set of regulatory rules applicable to new mothers, which are embodied in event subscriptions 204. In this case, SSE 104 would determine that rules such as the issuance of a social security number to the new born baby and the change of status from pregnancy leave to maternity leave should be executed immediately, and that rules such as health care benefits of post-delivery checkups or pediatrics care can be executed in a delayed workflow process. Additionally, in step 404, SSE 104 also filters event subscriptions by checking whether a "case exists" condition is met to determine the case category of the event. For example, if a case category for new born baby is included in SSE 104, then the "case exists" condition is true for the benefit claim submitted by the new mother in the example above. SSE 104 would filter the event subscriptions pertaining to the new born baby accordingly so that they receive appropriate processing priority. After filtering event subscriptions by processing priority and case category, SSE 104 sets event subscriptions 204 as rules that BRF program 109 can execute, and communicates the BRF rules to BRF program 109 in steps 405 and 406. Finally, BRF program 109 executes BRF rules that need to be processed immediately. This procedure is repeated for event subscriptions 204 with the delayed processing priority.

In another embodiment of the invention, rules communicated from SSE 104 to BRF program 109 are parameterized by SSE 104 such that the expression evaluated by BRF program 109 contains information such as processing priority, case category, and security authorization of the system administrator.

Figure 5:
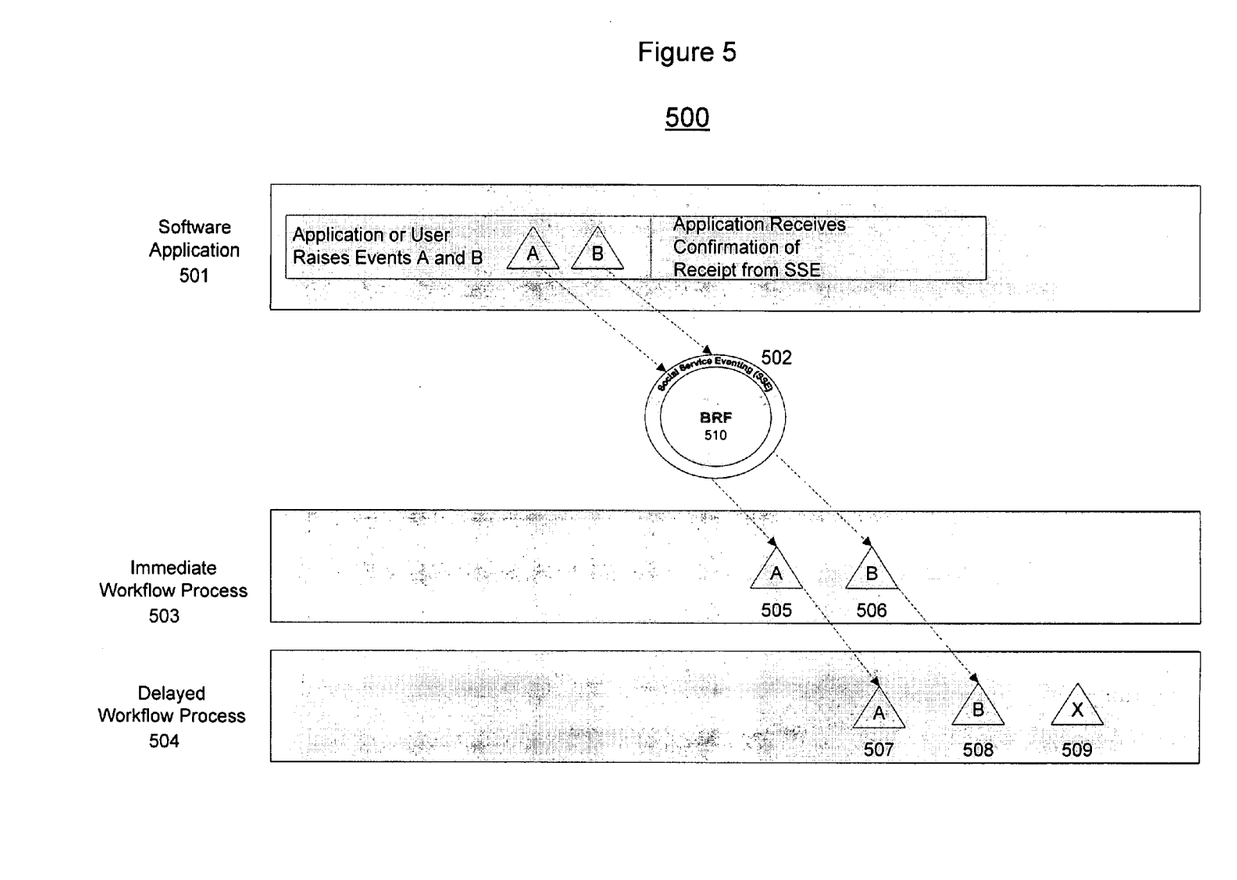
FIG. 5 is a functional flow diagram illustrating one conceptual embodiment of asynchronous processing of business rules in SSE.

FIG. 5 is a functional diagram illustrating one conceptual embodiment of the current invention that processes an event as a single logical work unit. Software application 501 is shown to have raised events A and B. After SSE 104 provides confirmation that event data was received, software application 501 returns to its existing work process and continues its work. SSE 502 processes both events by assigning appropriate event subscriptions, calling BRF program 510, and initiating an immediate workflow process 503 and a delayed workflow process 504. The use of the current invention allows SSE 502, in conjunction with BRF program 510, to process all event subscriptions of event A, whether immediate or delayed, as a single logical work unit. That is, the processing of event A is not interrupted by the execution of immediate event subscriptions of event B. In this sense, the current invention ensures the processing integrity of a single event at a time. As illustrated in FIG. 5, the current invention allows a queue of events in a workflow process with subscriptions that need to be executed immediately, and a queue of events in another workflow process with subscriptions that can be executed later.

Figure 7:
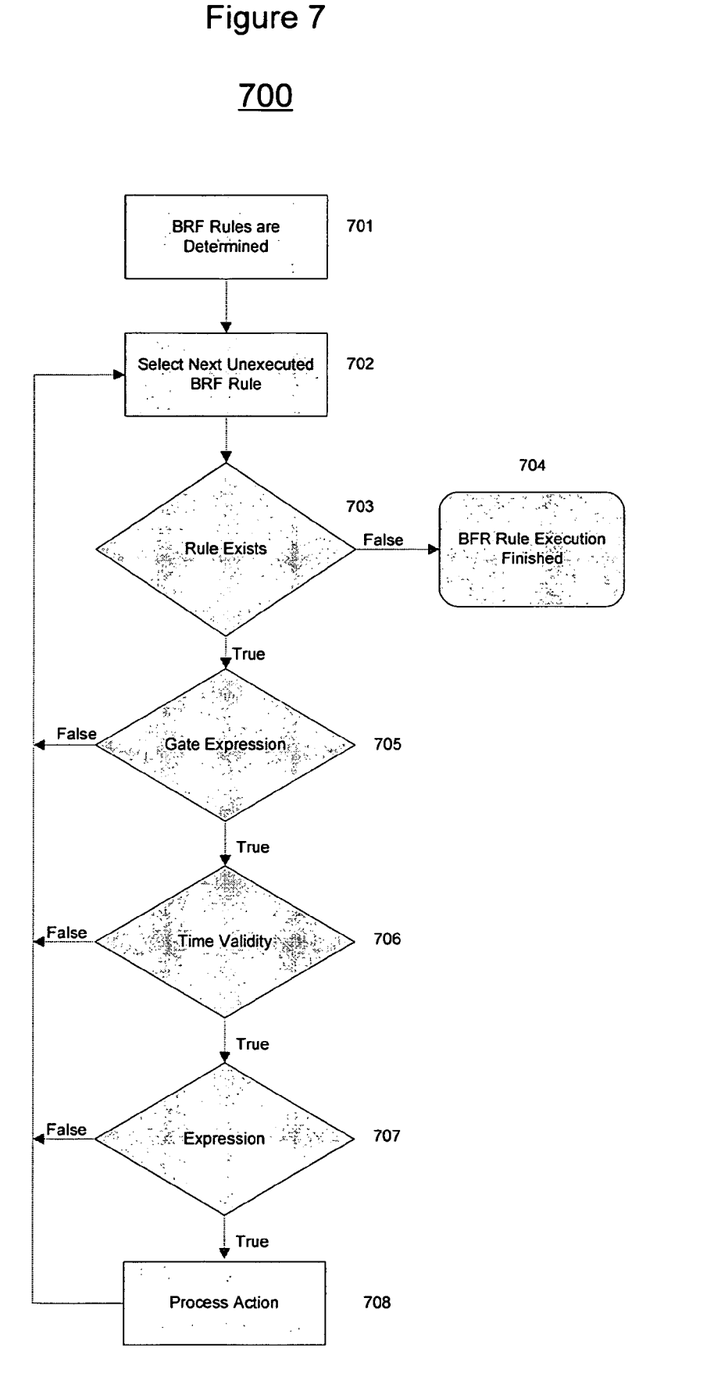
FIG. 7 is a flow chart illustrating one embodiment of the sequence of rule execution in a business rule framework program.

FIG. 7 is a flow chart illustrating one embodiment of the execution of rules by BRF program 109. After BRF rules are determined in 701, BRF program 109 selects the next unexecuted BRF rule in 702. According to 703, if an unexecuted rule exists, then the process continues to 705; otherwise, the process ends at 704. If conditions such as gate expression 705, time validity 706, and expression 707 are all true, then BRF program 109 proceeds to process an appropriate action according to the BRF rule in 708. However, if any of the conditions are false, then BRF program 109 proceeds to the next unexecuted BRF rule and repeats steps 702-707.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. An event processing computer system comprising:
   a social service eventing program stored on a computer readable storage medium providing a program interface between a plurality of software applications containing events to be raised,
   wherein the social service eventing program is to: receive event data from the plurality of software applications; send confirmation of the receipt of the event data to the plurality of software applications, wherein the plurality of software applications return to one or more existing work processes after receiving the confirmation from the social service eventing program; perform rule determination to assign event subscriptions to the events raised by the plurality of software applications, wherein event subscriptions are a set of business or regulatory rules; set the assigned event subscriptions to parameterized business rule framework (BRF) rules, wherein the parameterized BRF rules contain a case category, a processing priority, and an authorization level granted to the system administrator; initiate a BRF program for execution of the parameterized BRF rules; send the BRF program the parameterized BRF rules; and initiate workflow processes for processing of the events raised by the plurality of software applications.

2. The system of claim 1, wherein the events contain information, including event type, event subscriptions, and event instance data.

3. The system of claim 2, wherein the event type contains event type hierarchy.

4. The system of claim 2, wherein the event instance data contains event attributes and event context.

5. The system of claim 1, wherein the event data received by the social service eventing program contains the event type, the event attributes, and the event context.

6. The system of claim 1, wherein the event subscriptions are rules embodied in logical conditions, of which if true, initiate actions to be processed.

7. The system of claim 1, wherein the social service eventing program performs rule determination by reading the event subscriptions available to the events based on the event data received from the plurality of software applications, deciding processing priority of the event subscriptions, and filtering event subscriptions based on the processing priority.

8. The system of claim 7, wherein the social service eventing program decides the processing priority of the event subscriptions by comparing the event subscriptions available to the events and the received event data and determining a set of event subscriptions for immediate processing and a set of event subscriptions for delayed processing.

9. The system of claim 7, wherein the social service eventing program performs rule determination based on authorization granted to a system administrator using the computer system.

10. The system of claim 9, wherein the authorization granted to the system administrator is based on an individual level.

11. The system of claim 9, wherein the authorization granted to the system administrator is based on an organizational unit level.

12. The system of claim 6, wherein the social service eventing program performs rule determination by verifying whether the events raised by the plurality of software applications belong to particular case categories.

13. The system of claim 1, wherein the BRF program maintains an error log that records errors occurred during the execution of the BRF rules.

14. The system of claim 1, wherein the social service eventing program checks the error log and processes errors depending on whether the errors occurred after the events were raised, and whether the errors were permanent or temporary.

15. An event processing computer-implemented method comprising the steps of:
receiving event data from a plurality of software applications by a social service eventing program stored on a computer readable storage medium;
sending, by the social service eventing program, confirmation of the receipt of the event data to the plurality of software applications, wherein the plurality of software applications return to one or more existing work processes after receiving the confirmation from the social service eventing program;
initiating a first workflow process to be executed by a processor and process immediate event subscriptions by the social service eventing program, wherein event subscriptions are a set of business or regulatory rules;
initiating a business rule framework (BRF) program by the social service eventing program;
determining the immediate event subscriptions to be applied to the event by the social service eventing program;
setting the immediate event subscriptions to be applied to the event to parameterized BRF rules by the social service eventing program, wherein the parameterized BRF rules contain a case category, a processing priority, and an authorization level granted to the system administrator;
executing the parameterized BRF rules by the BRF program;
initiating a second workflow process to process delayed event subscriptions by the social service eventing program;
initiating the BRF program by the social service eventing program;
determining the delayed event subscriptions to be applied to the event by the social service eventing program;
setting the delayed event subscriptions to be applied to the event to parameterized BRF rules by the social service eventing program; and
executing the parameterized BRF rules by the BRF program.

16. The method of claim 15, wherein the event contains information, including event type, event subscriptions, and event instance data.

17. The method of claim 16, wherein the event type contains event type hierarchy.

18. The method of claim 16, wherein the event instance data contains event attributes and event context.

19. The method of claim 15, wherein the event data received by the social service eventing program contains the event type, the event attributes, and the event context.

20. The method claim 15, wherein the immediate event subscriptions are rules embodied in logical conditions that are to be executed immediately, of which if true, initiate actions to be processed.

21. The method of claim 15, wherein the social service eventing program determines the immediate event subscriptions by reading the event subscriptions available to the event based on the event data received, comparing the event subscriptions with the event data received, and deciding processing priority to be immediate.

22. The method of claim 15, wherein the social service eventing program determines the immediate event subscriptions based on authorization granted to a system user of the program.

23. The method of claim 22, wherein the authorization granted to a system user is based on an individual level.

24. The method of claim 22, wherein the authorization granted to a system user is based on an organizational unit level.

25. The method claim 15, wherein the delayed event subscriptions are rules embodied in logical conditions that are to be executed after the execution of the immediate event subscriptions, of which if true, initiate actions to be processed.

26. The method of claim 15, wherein the social service eventing program determines the delayed event subscriptions by reading the event subscriptions available to the event based on the event data received, comparing the event subscriptions and the event data received, and deciding the processing priority to be delayed.

27. The method of claim 15, wherein the social service eventing program determines the delayed event subscriptions based on authorization granted to the system user of the program.

28. The method of claim 27, wherein the authorization granted to a system user is based on an individual level.

29. The method of claim 27, wherein the authorization granted to a system user is based on an organizational unit level.

30. The method of claim 15, wherein the social service eventing program determines whether the event belongs to a particular case category.

31. The method of claim 15, further comprising the step of maintaining an error log that records errors occurred during the execution of the BRF rules by the BRF program.

32. The method of claim 15, further comprising the steps of the social service eventing program:
   checking the error log; and
   processing an error depending on whether the error occurred after the software application raised the event, and whether the error was permanent or temporary.

33. A non-transitory computer readable storage medium having program instructions stored thereon that, when executed by a processor, perform the steps of: raising an event to be processed by one or more software applications; sending event data to a social service eventing program; confirming the receipt of the event data to the one or more software applications; initiating a first workflow process to process immediate event subscriptions, wherein event subscriptions are a set of business or regulatory rules; initiating a business rule framework (BRF) program; determining the immediate event subscriptions to be applied to the event; setting the immediate event subscriptions to be applied to the event to parameterized BRF rules, wherein the parameterized BRF rules contain a case category, a processing priority, and an authorization level granted to the system administrator; executing the parameterized BRF rules; initiating a second workflow process to process delayed event subscriptions; initiating the BRF program; determining the delayed event subscriptions to be applied to the event; setting the delayed event subscriptions to be applied to the event to parameterized BRF rules; executing the parameterized BRF rules.

34. The medium of claim 33, wherein the event contains information, including event type, event subscriptions, and event instance data.

35. The medium of claim 34, wherein the event type contains event type hierarchy.

36. The medium of claim 34, wherein the event instance data contains event attributes and event context.

37. The medium of claim 33, wherein the event data sent to the social service eventing program contains the event type, the event attributes, and the event context.

38. The medium claim 33, wherein the immediate event subscriptions are rules embodied in logical conditions that are to be executed immediately, of which if true, initiate actions to be processed.

39. The medium of claim 33, wherein the social service eventing program determines the immediate event subscriptions by reading the event subscriptions available to the event based on the event data received, and comparing the event subscriptions and the event data received, and deciding processing priority to be immediate.

40. The medium of claim 33, wherein the social service eventing program determines the immediate event subscriptions based on authorization granted to a system user of the program.

41. The medium of claim 40, wherein the authorization granted to the system user is based on an individual level.

42. The medium of claim 40, wherein the authorization granted to the system user is based on an organizational unit level.

43. The medium of claim 33, wherein the social service eventing program determines the delayed event subscriptions by reading the event subscriptions available to the event based on the event data received, comparing the event subscriptions and the event data received, and deciding the processing priority to be delayed.

44. The medium of claim 33, wherein the social service eventing program determines the delayed event subscriptions based on authorization granted to the system user of the program.

45. The medium of claim 44, wherein the authorization granted to the system user is based on an individual level.

46. The medium of claim 44, wherein the authorization granted to the system user is based on an organizational unit level.

47. The medium of claim 33, wherein the social service eventing program determines whether the event belongs to a particular case category.

48. The medium of claim 33, further performs the step of maintaining an error log that records errors occurred during the execution of the BRF rules.

49. The medium of claim 33, further performs the steps of the social service eventing program:
   checking the error log; and
   processing an error depending on whether the error occurred after the software application raised the event, and whether the error was permanent or temporary.

* * * * *